(12) United States Patent
Abrahamson

(10) Patent No.: US 9,447,821 B2
(45) Date of Patent: Sep. 20, 2016

(54) BEARING OUTER RACE

(71) Applicant: Koyo Bearings North America LLC, Westlake, OH (US)

(72) Inventor: Scott Abrahamson, Piedmont, SC (US)

(73) Assignee: Koyo Bearings North America, LLC, Westlake, OH (US)

(*) Notice: Subject to any disclaimer, the term of this patent is extended or adjusted under 35 U.S.C. 154(b) by 0 days.

(21) Appl. No.: 14/365,292

(22) PCT Filed: Dec. 13, 2012

(86) PCT No.: PCT/US2012/069494
§ 371 (c)(1),
(2) Date: Jun. 13, 2014

(87) PCT Pub. No.: WO2013/103495
PCT Pub. Date: Jul. 11, 2013

(65) Prior Publication Data
US 2014/0334760 A1    Nov. 13, 2014

Related U.S. Application Data

(60) Provisional application No. 61/570,005, filed on Dec. 13, 2011.

(51) Int. Cl.
*F16C 33/60* (2006.01)
*F16C 33/64* (2006.01)
(Continued)

(52) U.S. Cl.
CPC .......... *F16C 33/605* (2013.01); *F16C 19/225* (2013.01); *F16C 19/46* (2013.01);
(Continued)

(58) Field of Classification Search
CPC .... F16C 19/225; F16C 19/46; F16C 33/585; F16C 33/588; F16C 33/64; F16C 33/605; F16C 33/60; F16C 33/46; F16C 19/466; F16C 33/7908; F16C 33/7808; F16C 2226/70; F16C 33/583; Y10T 29/49689
USPC ....... 384/564–565, 559, 569, 570, 577, 906; 29/898.061, 898.062, 898.066
See application file for complete search history.

(56) References Cited

U.S. PATENT DOCUMENTS 1,520,053 A * 12/1924 Drotschmann ......... F16C 19/26
                                                29/898.061
3,253,869 A *  5/1966 Smith ................... F16C 19/466
                                                384/564
(Continued)

FOREIGN PATENT DOCUMENTS

CN    101228361    7/2008
CN    101529105    9/2009
(Continued)

OTHER PUBLICATIONS

International Search Report and the Written Opinion for PCT/US2012/069494 dated Mar. 25, 2013.
(Continued)

*Primary Examiner* — Marcus Charles
(74) *Attorney, Agent, or Firm* — Nelson Mullins Riley & Scarborough, LLP

(57) ABSTRACT

A roller bearing assembly (10) having an annular outer race (22) with a raceway (24), a pair of opposed flanges (30), and a pair of shoulders (32), each shoulder (32) being disposed between a corresponding flange (30) and a corresponding edge of the raceway (24), a roller retainer (12) defining a plurality of roller pockets (16), and a plurality of rollers (14), each roller (14) being disposed in a corresponding roller pocket (16). Each shoulder (32) forms an annular ridge (32a) with the corresponding edge of the raceway (24).

12 Claims, 8 Drawing Sheets

(51) Int. Cl.
*F16C 19/22* (2006.01)
*F16C 19/46* (2006.01)
*F16C 33/58* (2006.01)

(52) U.S. Cl.
CPC ......... *F16C 33/585* (2013.01); *F16C 33/588* (2013.01); *F16C 33/64* (2013.01); *F16C 2226/70* (2013.01); *Y10T 29/49689* (2015.01)

(56) References Cited

U.S. PATENT DOCUMENTS

| | | | | |
|---|---|---|---|---|
| 3,284,145 A | * | 11/1966 | Bixby | F16C 19/46 |
| | | | | 277/551 |
| 3,307,891 A | * | 3/1967 | Carullo | F16C 27/04 |
| | | | | 384/569 |
| 3,539,232 A | | 11/1970 | Batt | |
| 3,539,233 A | | 11/1970 | Hallerback | |
| 3,558,200 A | * | 1/1971 | Barr | F16C 19/46 |
| | | | | 29/898.062 |
| 5,397,188 A | * | 3/1995 | Yoshizuka | C21D 9/36 |
| | | | | 384/492 |
| 5,501,532 A | | 3/1996 | Terrill | |
| 5,902,022 A | * | 5/1999 | Shattuck | F16C 19/26 |
| | | | | 384/569 |
| 6,176,623 B1 | * | 1/2001 | Zeigler | F16C 19/46 |
| | | | | 29/898.066 |
| 7,416,346 B2 | * | 8/2008 | Takemura | F16C 19/225 |
| | | | | 384/450 |
| 8,128,291 B2 | | 3/2012 | Katayama et al. | |
| 8,523,452 B2 | | 9/2013 | Yamakawa et al. | |

FOREIGN PATENT DOCUMENTS

| | | | |
|---|---|---|---|
| CN | 101796313 | | 8/2010 |
| DE | GB 1189965 A | * | 4/1970 ............ F16C 13/006 |
| DE | 2745826 | | 4/1979 |
| FR | 950839 | | 10/1949 |
| JP | 4811731 | | 4/1973 |
| JP | 2004116718 | | 4/2004 |
| JP | 2007232135 | | 9/2007 |
| JP | 2007270850 A | * | 10/2007 |
| JP | 2008038991 | | 2/2008 |
| JP | 2008057743 | | 3/2008 |
| JP | 2009210034 A | * | 9/2009 |
| JP | 2010210032 | | 9/2010 |

OTHER PUBLICATIONS

Office Action dated Oct. 10, 2015 for Chinese Application No. 201280061546.7.
Office Action dated May 26, 2015 for Japanese Application No. 2014-547420.
Office Action dated Jun. 15, 2015 for Korean Application No. 10-2014-7015707.

* cited by examiner

BEARING OUTER RACE

FIELD OF THE INVENTION

The present disclosure related generally to roller bearings. More particularly, the present disclosure related to a radial roller bearing with a two-piece outer race.

BACKGROUND

Typically, for known radial bearings that include outer races having flanges, the flanges are substantially the same width as the raceway of the race. As such, when constructing the finished race, the flanges can be bent into their final position, which is usually transverse to the raceway, with reduced risk of causing damage to the raceway. However, it is sometimes necessary to have a raceway that is substantially thicker than the thickness required for the flanges, such as when carbonization of a raceway constructed of low carbon metal is desired. In these instances, where the flange thickness is increased similarly to the raceway thickness, there is increased risk of causing damage to the raceway as the flanges are bent into their final positions. As well, this risk also exists in known races in which the thickness of the flanges remains constant and the thickness of the raceway is increased in that the transition from the flanges to the raceway is typically gradual and continuous, leading to the increased risk of transferring stresses to the raceway as the flanges are bent.

The present invention recognizes and addresses the foregoing considerations, and others, of prior art constructions.

SUMMARY

One embodiment of a roller bearing assembly in accordance with the present disclosure is a roller bearing assembly comprising an annular outer race having a raceway, a pair of opposed flanges, and a pair of shoulders, each shoulder being disposed between a corresponding flange and a corresponding edge of the raceway. A roller retainer defines a plurality of roller pockets for a plurality of rollers, each roller being disposed in a corresponding roller pocket. Each shoulder forms an annular ridge with the corresponding edge of the raceway.

Another embodiment of a roller bearing assembly in accordance with the present disclosure is an outer race for use with a bearing assembly having a plurality of rollers, including an annular raceway having an inner surface, outer surface, and a pair of opposed edges extending therebetween, each edge being a first width as measured from its inner surface to its outer surface, a pair of annular shoulders, each shoulder having a proximal end disposed adjacent a corresponding edge of the annular raceway and a distal end extending outwardly therefrom, and a pair of flanges, each flange having a proximal end adjacent the distal end of a corresponding shoulder, a distal end extending outwardly therefrom, an inner surface and an outer surface, the proximal end of each flange being a second width as measured from its inner surface to its outer surface. The first width is greater than the second width and an annular ridge is formed at the intersection of the inner surface of the shoulder and the inner surface of the raceway.

Yet another embodiment of a roller bearing assembly in accordance with the present disclosure is a method of producing an annular race for a bearing assembly, including the steps of performing a rolling process on a piece of metal, thereby producing a first liner having a raceway and a pair of flanges depending outwardly from opposing edges of the raceway, a maximum width of each flange being less than a minimum width of the raceway, performing a rolling process on a second piece of metal, thereby producing a second liner having a raceway and a pair of flanges depending outwardly from opposing edges of the raceway, a maximum width of each flange being less than a minimum width of the raceway, bending each flange relative to the raceway until each flange is substantially transverse to the raceway, and positioning opposing ends of the first liner adjacent opposing ends of the second liner, thereby forming the annular race.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
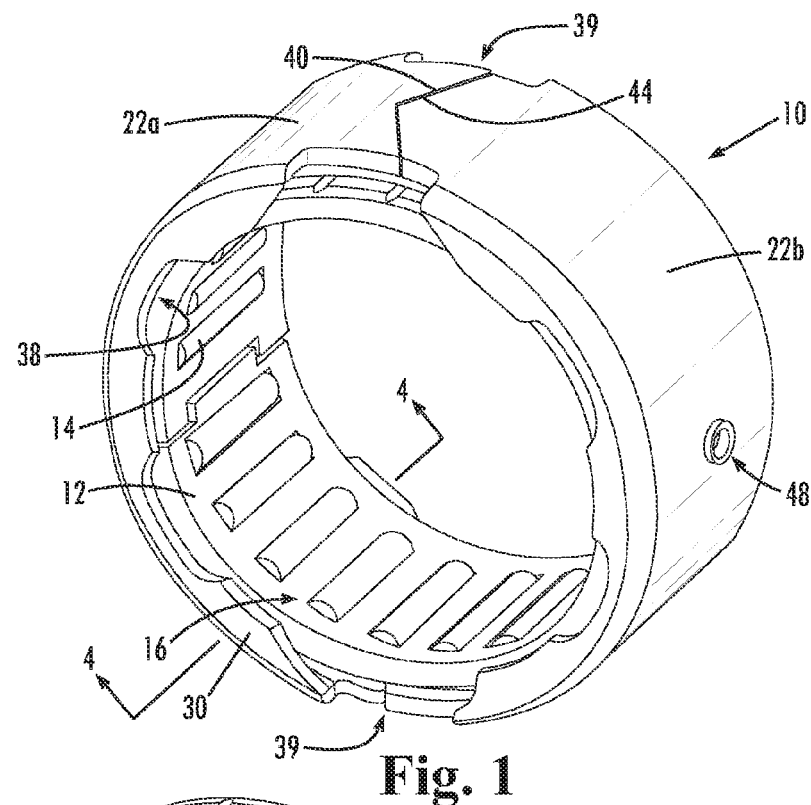
FIG. 1 is a perspective view of a roller bearing assembly in accordance with an embodiment of the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the disclosure, one or more examples of which are illustrated in the accompanying drawings. Each example is provided by way of explanation, not limitation, of the invention. In fact, it will be apparent to those skilled in the art that modifications and variations can be made in the present disclosure without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 3:
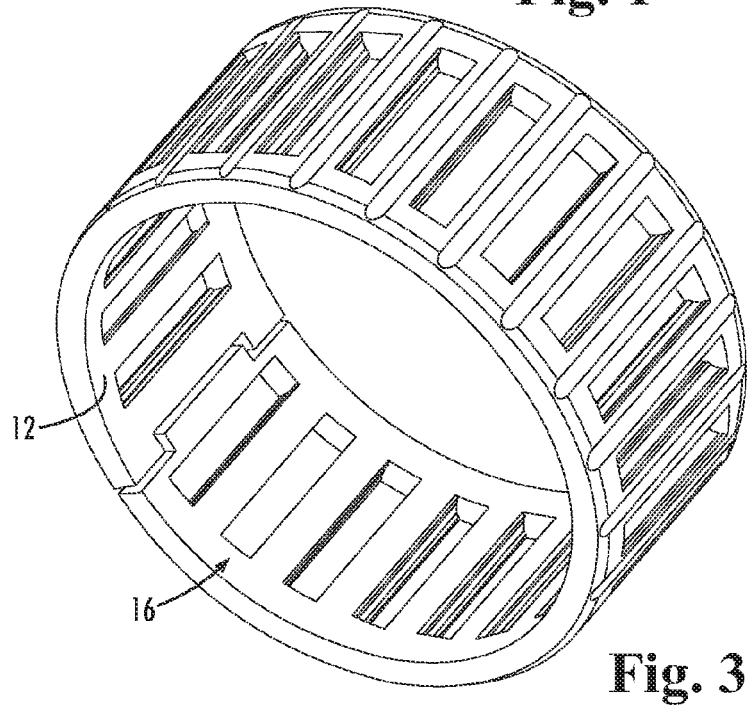
FIG. 3 is a perspective view of a one-piece split retainer of the bearing assembly as shown in FIG. 1.
Figure 2A:
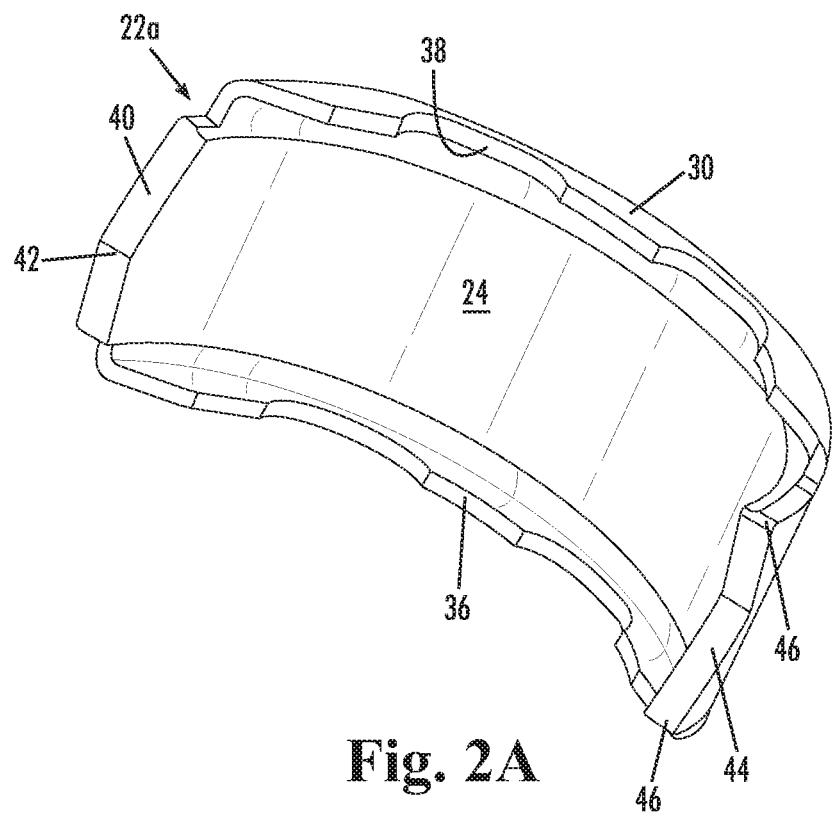
FIG. 2A is a perspective view of a first liner of the roller bearing assembly shown in FIG. 1.
Figure 2B:
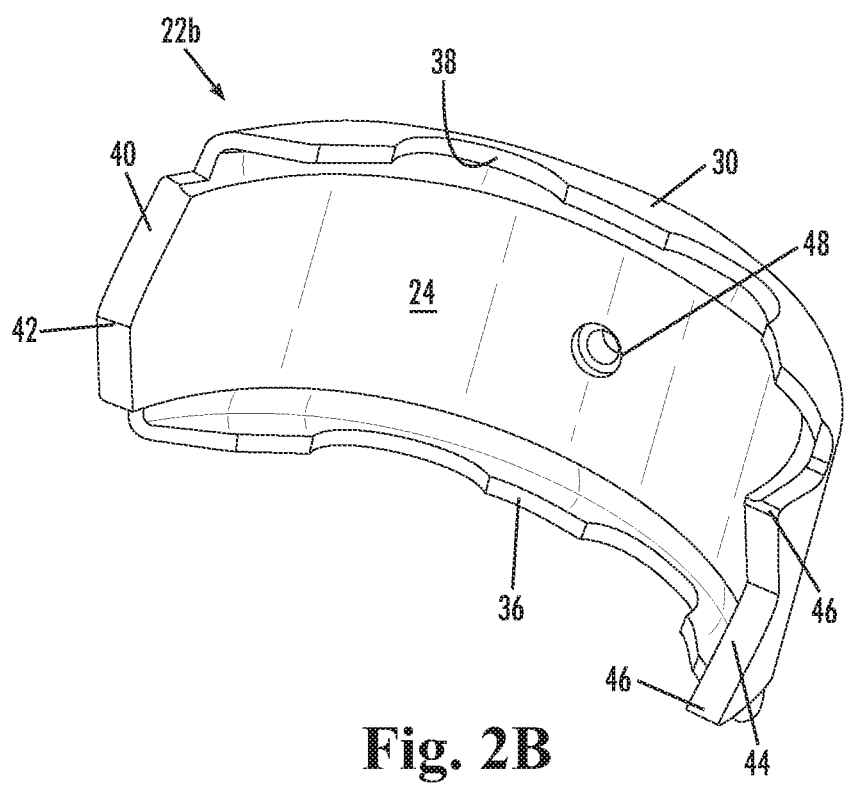
FIG. 2B is a perspective view of a second liner of the roller bearing assembly shown in FIG. 1.

Referring now to the figures, a roller bearing assembly 10 in accordance with the present disclosure is shown in FIGS. 1 through 3. Roller bearing assembly 10 includes an outer race 22 defining a raceway 24, a roller retainer 12 defining a plurality of roller pockets 16, and a plurality of rollers 14, each roller 14 being retained in a corresponding roller pocket 16. Outer race 20 includes a first liner 22a and a second liner 22b, each including a corresponding portion of raceway 24, a pair of flanges 30 disposed on opposing sides thereof, and a male chevron 40 and female chevron 44, disposed on opposing ends of the corresponding raceway portion. As best seen in FIG. 1, male chevrons 40 are configured to be fittingly received by female chevrons 44. In the embodiment shown, roller bearing assembly 10 includes one-piece split retainer 12. However, alternate embodiments may include a two-piece retainer, a non-split one-piece retainer, no retainer, such as with a "full complement" of rollers, or other retainer configuration.

Figure 4:
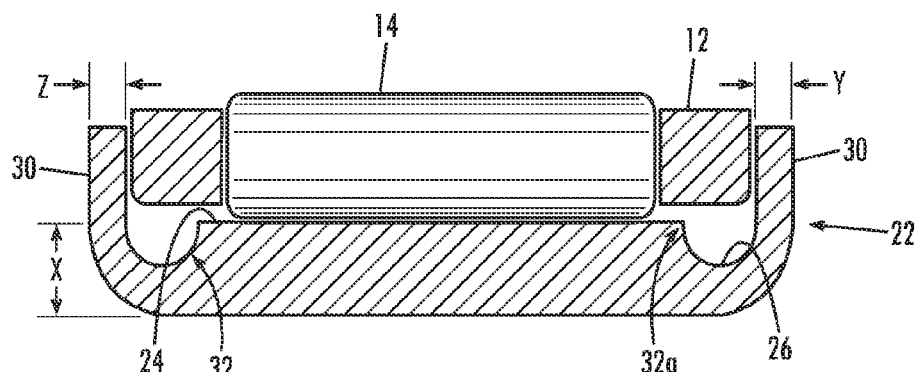
FIG. 4 is a cross-sectional view of the roller bearing assembly shown in FIG. 1, taken along line 4-4.
Figure 5:
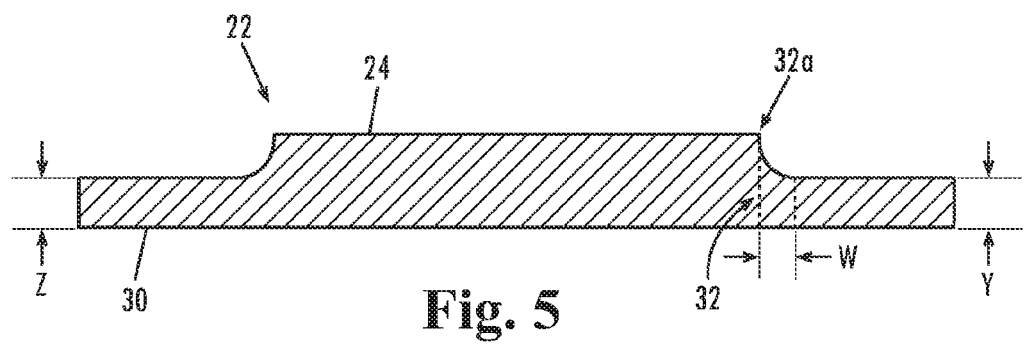
FIG. 5 is a cross-sectional view of the first liner of the roller bearing assembly shown in FIG. 1, prior to the flanges being bent into their final position.

Referring additionally to FIGS. 4 and 5, raceway 24 of outer race 20 is substantially thicker (X) than either of opposed flanges 30 (Y and Z), as measured from their inner surfaces to their outer surfaces. Preferably, this configuration is accomplished by using a rolling process to pre-condition the material of the first and second liners 22a and 22b, respectively, prior to a stamping process. As best seen in FIG. 5, prior to the stamping process, the rolling process results in liner having a pair of flanges 30 depending outwardly from opposing sides of raceway 24, with a shoulder 32 disposed between the proximal end of each flange 30 and the respective side of raceway 24. Each shoulder 32 forms a transition between the differing thicknesses of raceway 24 and flanges 30, and serves to isolate raceway 24 from stresses resulting from the bending process used when forming flanges 30. Preferably, each shoulder 32 defines an annular ridge 32a where it joins the corresponding edge of raceway 24. As well, each shoulder 32 also forms a continuous, annular concave surface 26 between raceway 24 and the corresponding flange 30. The reduced thickness of each flange 30 relative to raceway 24, combined with the structure of the corresponding shoulders 32, allows the flanges to be bent toward the bore of roller bearing assembly 10 with a reduced likelihood of disturbing the integrity of outer race 10. Note, although the previously discussed preferred method includes a rolling process, alternate embodiments of the present invention are not limited to methods requiring a rolling process.

Flanges 30 limit motion of retainer 12 along raceway 24 parallel to a longitudinal center axis of roller bearing assembly 10, and enhance the structural rigidity of first and second liners 22a and 22b. Additionally, a distal edge 36 of each flange 30 includes one or more scallops 38 to facilitate lubrication. More specifically, as best seen in FIG. 1, scallops 38 provide clearances that allow lubrication to more readily enter roller bearing assembly 10, thereby reaching rollers 14, which is preferable for applications in a splash lubrication environment (i.e. automotive cam shafts). As well, scallops 38 facilitate the bending of flanges 30 during the manufacturing, or forming, process. More specifically, scallops 38 relieve stresses in locations that may tend to buckle if not constrained during the forming process. Additionally, stresses are relieved that could otherwise be induced on raceway 24 when bending the flanges 30, thereby potentially causing damage to the raceway.

As noted above, and shown in FIG. 4, the utilization of thin flanges 30 facilitates the use of a wider raceway 24. A wider, or thicker, raceway 24, as represented by (X), allows for increased surface area at the mating location, more specifically male chevrons 40 and female chevrons 44, of first liner 22a and second liner 22b. The increased surface area allows the current design to handle, relative to prior art designs, high clamping stresses required when differing expansion rates are present, such as, in automotive applications where dissimilar materials are operating in large temperature ranges. Additionally, the increased thickness (X) of raceway 24 provides the ability to support deeper cases during carbonization than would note be possible with a thinner raceway, which is advantageous when low carbon materials are used. The use of deeper cases offers various advantages in high contact stress applications, such as use with crank shafts.

Figure 6:
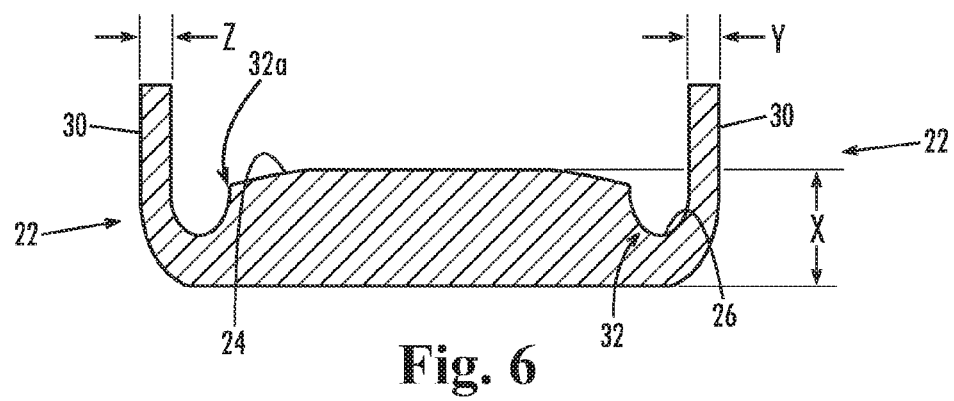
FIG. 6 is a cross-sectional view of a liner in accordance with an alternate embodiment of the present disclosure.

Referring now to FIG. 6, an alternate embodiment of a liner 22, in accordance with the present disclosure, is shown. Liner 22 differs primarily from the previously discussed embodiment in that raceway 24 includes a contoured surface. A contoured raceway 24 is desirable to obtain optimal stress profile for roller bearing assemblies that are used in applications where the centerline of the bearing and the centerline of the supported shaft may be misaligned. The amount to which the profile of raceway 24 is contoured is variable depending on the application of the roller bearing assembly.

Figure 7:
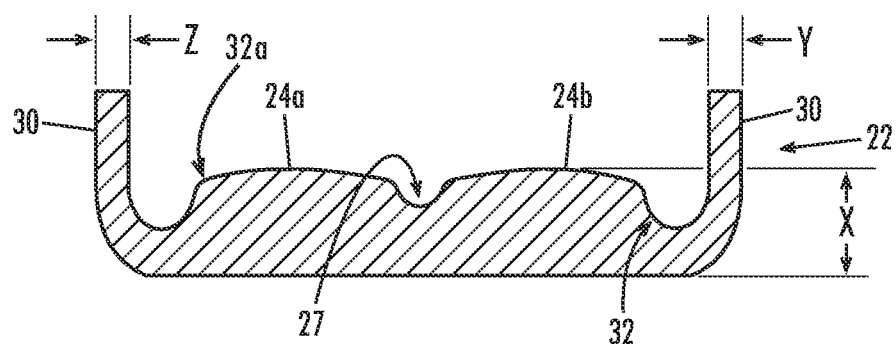
FIG. 7 is a cross-sectional view of a liner in accordance with an alternate embodiment of the present disclosure.
Figure 8:
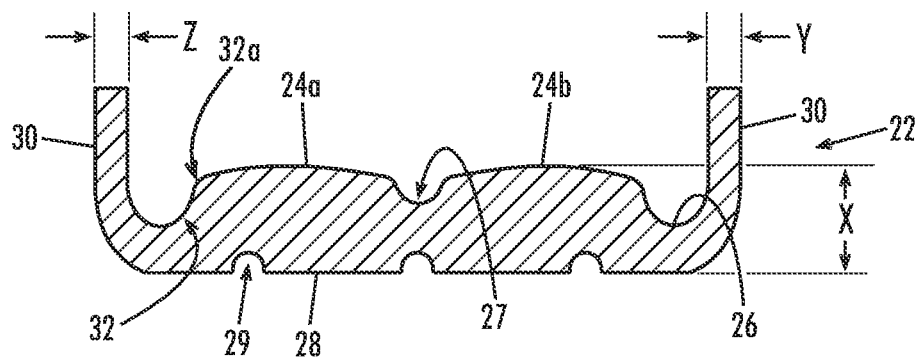
FIG. 8 is a cross-sectional view of a liner in accordance with an alternate embodiment of the present disclosure.

As shown in FIG. 7, in addition to reducing the thickness of flanges 30 relative to the raceway and providing a contoured profile for raceway 24, utilization of a rolling mill prior to the press assembly allows multiple configurations of grooves to be rolled into the liners. As shown in FIG. 7, an annular groove 27 is formed in the top surface of raceway 24, thereby forming a first raceway 24a and second raceway 24b, such as would be used with double row retainers. Also, as shown in FIG. 8, annular grooves 29 may be formed on an outer surface 28 of liner 22 to support such items as location features, anti-rotation features, lubrication porting, etc.

Figure 9:
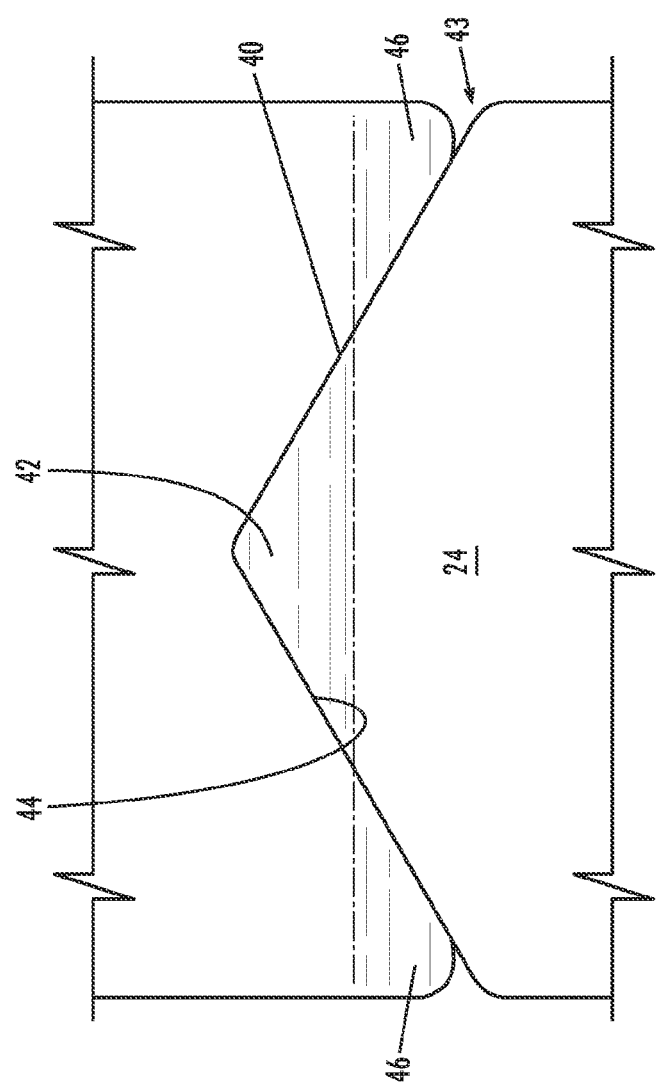
FIGS. 9A and 9B are an inside view and a side view of a joint between the first liner and the second liner of the roller bearing assembly as shown in FIG. 1.

As noted above, and as shown in FIGS. 9A and 9B, each of first liner 22a and second liner 22b includes a male chevron 40 and a female chevron 44 disposed at their opposed ends to allow the two liners to mate and form a gradual transition for rollers 14 to cross from one liner to the other. Moreover, a lead point 42 of both male chevrons 40 and trailing points 46 of both female chevrons 44 of first and second liners 22a and 22b include a bevel on their inner surfaces to accommodate the transition of rollers 14 from one liner to the other. Additionally, the edges 43 around the perimeter of male and female chevrons 40 and 44, respectively, are beveled to reduce the possibility of misalignment of first and second liners 22a and 22b, thus reducing the possibility of a high stress point and/or noise from the transition. As best seen in FIG. 1, flanges 30 are not continuous about the entire perimeter of outer race 20. Rather, gaps 39 exist in the vicinity of male and female chevrons 40 and 44, respectively. Gaps 39 also reduce the possibility of misalignment of first and second liners 22a and 22b, respectively, and provide additional clearances to facilitate lubrication of the bearing assembly.

Figure 10:
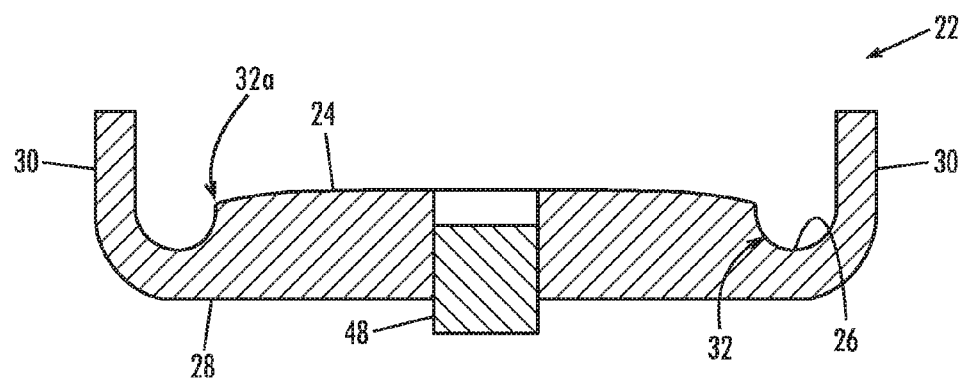
FIG. 10 is a cross-sectional view of a liner in accordance with an alternate embodiment of the present disclosure.
Figure 11:
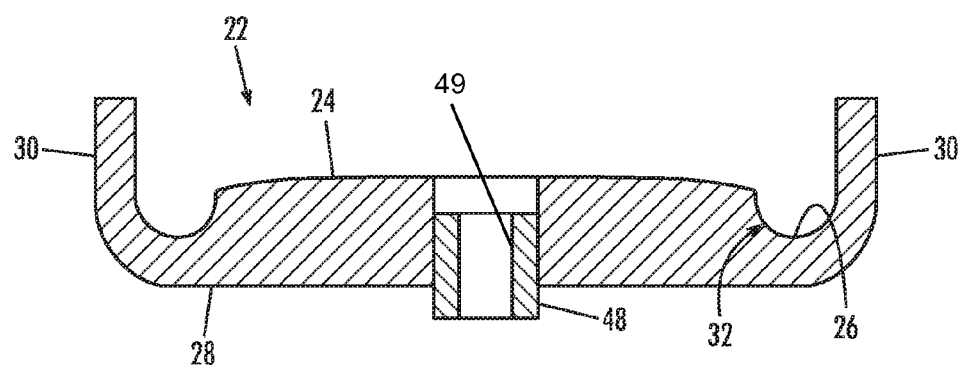
FIG. 11 is a cross-sectional view of the second liner shown in FIG. 2B, taken along line 11-11.

Referring now to FIGS. 10 and 11, anti-rotation features of the present disclosure are shown. In existing designs, an extruded hole is often used to produce a feature that protrudes through the back of a liner. This feature can then be used to align with a hole in the housing in which the roller bearing assembly is seated to prevent the assembly from rotating. However, this type of extrusion is known to create stresses in the corresponding liners that can cause distortion and lead to high localized stresses, premature failure and noise. In accordance with the present disclosure, the thicker raceway 24 of each liner 22 facilitates forming the anti-rotation feature using a semi-piercing process. As shown in FIG. 10, anti-rotation feature 48 is formed by a semi-piercing process. Additionally, as shown in FIG. 11, a lubrication aperture 49 can be formed in anti-rotation feature 48 in applications where pressurized lubrication of the roller bearing assembly is desired.

Figure 12A:
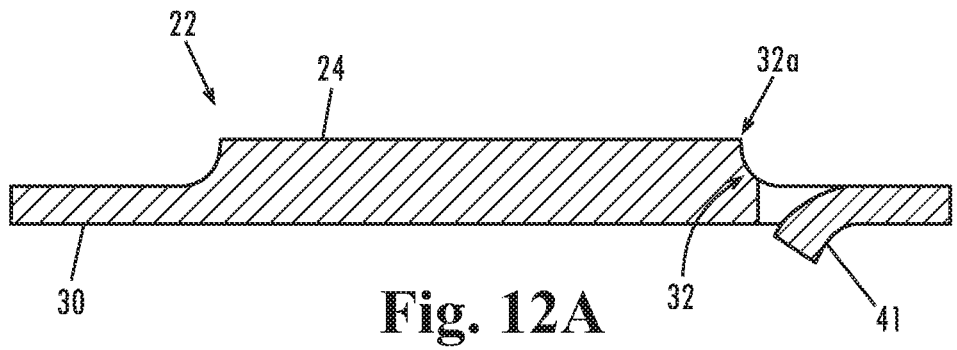
FIGS. 12A and 12B are cross-sectional views of a liner in accordance with an alternate embodiment of the present disclosure.
Figure 12B:
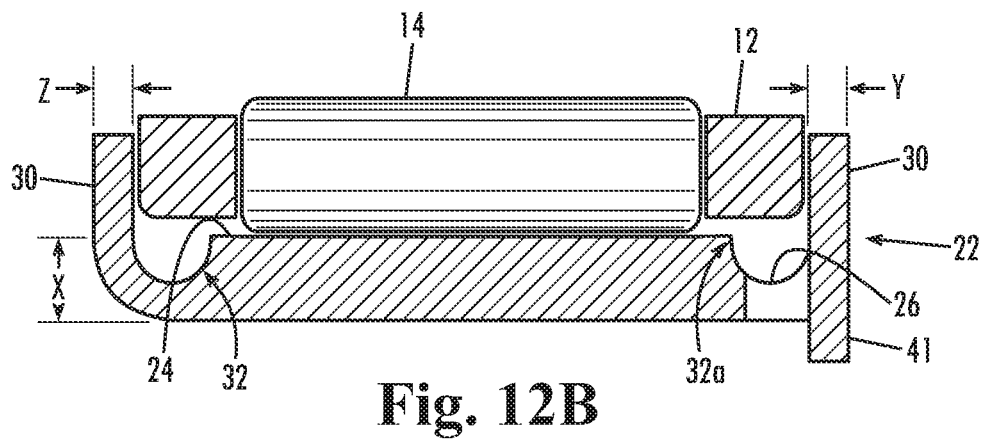

Referring now to FIGS. 12A and 12B, another anti-rotation feature can be accomplished by lancing a tang 41 in either shoulder 32 adjacent to the raceway 24. Preferably, as shown in FIG. 12A, tang 41 is partially created by the lancing operation prior to bending the flanges 30 inwardly into their final position relative to raceway 24. As the corresponding flange 30 is bent inwardly, tang 41 is caused to protrude an even greater distance outwardly from the liner, as shown in FIG. 12B. Tang 41 is then received in a pocket formed, such as by milling, in the corresponding housing to prevent rotation of the liner relative thereto.

Figure 13A:
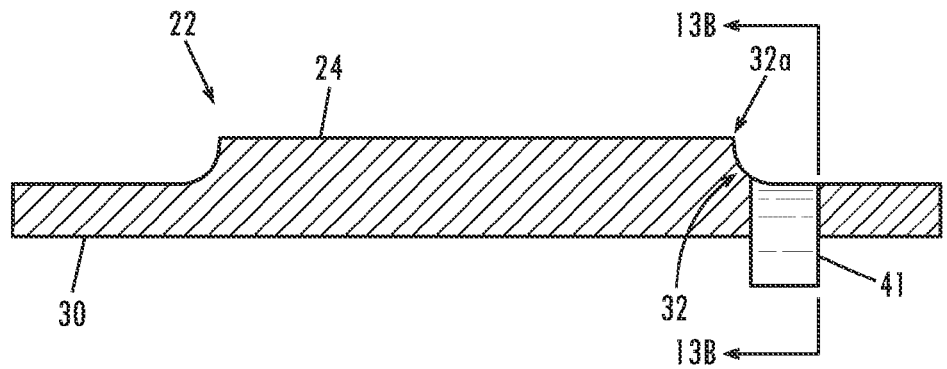
FIGS. 13A and 13B are cross-sectional views of a liner in accordance with an alternate embodiment of the present disclosure.
Figure 13B:
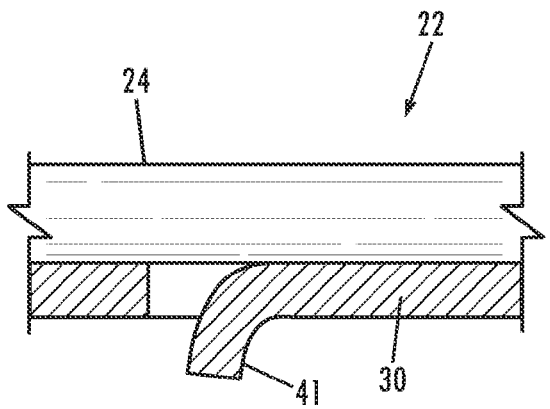

Referring now to FIGS. 13A and 13B, an alternate configuration of a tang 41 is shown. Note, tang 41, as shown, differs only from that in FIGS. 12A and 12B in that the connected end, or base, of the tang is transverse to ridge 32a of raceway 24, rather than parallel, as in FIGS. 12A and 12B.

Figure 14:
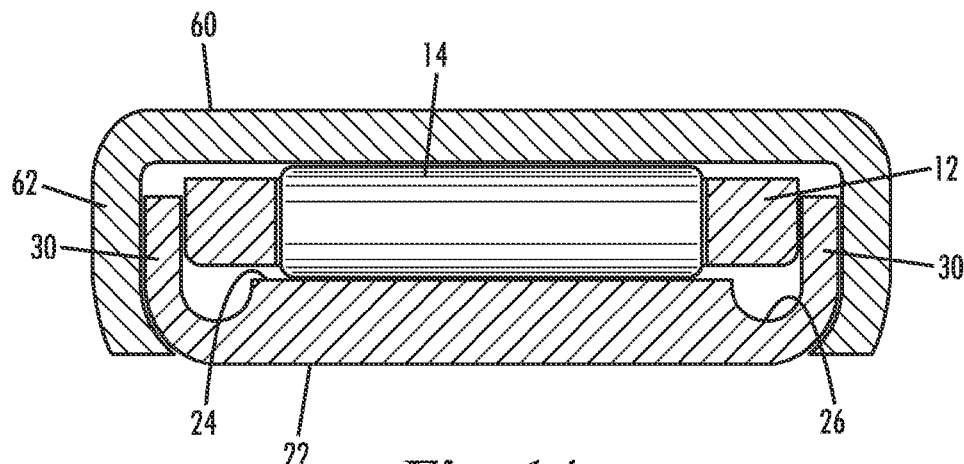
FIG. 14 is a cross-sectional view of the roller bearing assembly shown in FIG. 1, further including an assembly clip.

The previously discussed liner designs offer several possibilities that can facilitate the final assembly of the roller bearing assembly 10 into the application housing. As shown in FIG. 14, an assembly clip 60, made of plastic or steel, wraps around the liners to hold retainer 12 and rollers 14 within the liners. Clip 60 is intended to be used with the two-piece split cage and rollers. By securing retainer 12 and rollers 14 within liners 22, the roller bearing assembly 10 can be assembled as a one-piece unit into a split housing, as seen in crank and cam applications. This can be beneficial in saving final assembly time and money and only require the removal of the clip as assembly. It is also possible to make this a recyclable clip.

While one or more preferred embodiments of the invention are described above, it should be appreciated by those skilled in the art that various modifications and variations can be made in the present invention without departing from the scope and spirit thereof. For example, alternate embodiments of liners can include flanges that differ in thickness from each other, do not include flanges, etc. It is intended that the present invention cover such modifications and variations as come within the scope and spirit of the appended claims and their equivalents.

What is claimed is:

1. A roller bearing assembly, comprising:
    an annular outer race having a raceway, a pair of opposed flanges, and a pair of shoulders, each shoulder being disposed between a corresponding flange and a corresponding edge of the raceway;
    a projection extending outwardly from an outer surface of one of the pair of shoulders;
    a roller retainer defining a plurality of roller pockets; and
    a plurality of rollers, each roller being disposed in a corresponding roller pocket,
    wherein each shoulder forms an annular ridge with the corresponding edge of the raceway.

2. The roller bearing assembly of claim 1, wherein:
    an inner raceway defines a first width between its inner surface and outer surface,
    each flange defines a second width between its inner surface and outer surface, and
    the first width is greater than the second width.

3. The roller bearing assembly of claim 1, wherein:
    each edge of the raceway defines a first width between its inner surface and outer surface,
    each flange defines a second width between its inner surface and outer surface, each flange having substantially the same width from its distal end to its proximal end, and
    each shoulder is the first width at its proximal end adjacent the corresponding edge of the raceway and the second width at its distal end adjacent the proximal end of the corresponding flange.

4. The roller bearing assembly of claim 3, wherein the annular outer race further comprises a first liner and a second liner, the first liner and the second liner each being semi-cylindrical.

5. The roller bearing assembly of claim 4, further comprising a male chevron defined by a lead point and a female chevron defined by a pair of trailing points disposed at opposing ends of both the first liner and the second liner, wherein the lead point of each male chevron and the trailing points of each female chevron are beveled at their inside surfaces.

6. The roller bearing assembly of claim 1, wherein the inner surface of each shoulder is formed by a continuous concave surface.

7. An outer race for use with a bearing assembly having a plurality of rollers, comprising:
    an annular raceway having an inner surface, outer surface, and a pair of opposed edges extending therebetween, each edge being a first width as measured from its inner surface to its outer surface;
    a pair of annular shoulders, each shoulder having a proximal end disposed adjacent a corresponding edge of the annular raceway and a distal end extending outwardly therefrom;
    a projection extending outwardly from an outer surface of one of the pair of shoulders;
    a pair of flanges, each flange having a proximal end adjacent the distal end of a corresponding shoulder, a distal end extending outwardly therefrom, an inner surface and an outer surface, the proximal end of each flange being a second width as measured from its inner surface to its outer surface,
    wherein the first width is greater than the second width and an annular ridge is formed at the intersection of the inner surface of the shoulder and the inner surface of the raceway.

8. The roller bearing assembly of claim 7, wherein the annular outer race further comprises a first liner and a second liner, the first liner and the second liner each being semi-cylindrical.

9. The roller bearing assembly of claim 7, wherein the inner surface of each shoulder is formed by a continuous concave surface.

10. The roller bearing assembly of claim 7, wherein the width of each flange is substantially constant along its length from its distal end to its proximal end.

11. A method of producing an annular race for a bearing assembly, comprising the steps of:
 performing a rolling process on a first piece of metal, thereby producing a first liner having a raceway and a pair of flanges depending outwardly from opposing edges of the raceway, a maximum width of each flange being less than a minimum width of the raceway;
 performing a rolling process on a second piece of metal, thereby producing a second liner having a raceway and a pair of flanges depending outwardly from opposing edges of the raceway, a maximum width of each flange being less than a minimum width of the raceway;
 lancing a tang in one of the pair of flanges;
 bending each flange relative to the raceway until each flange is substantially transverse to the raceway; and
 positioning opposing ends of the first liner adjacent opposing ends of the second liner, thereby forming the annular race.

12. The method of producing an annular race of claim 11, wherein the rolling process steps for the first liner and the second liner further comprise providing a pair of shoulders for each of the first liner and the second liner, each shoulder being disposed between a corresponding edge of the raceway and a corresponding flange, thereby forming an annular ridge at the intersection of each shoulder and the corresponding edge of the raceway.

\* \* \* \* \*